United States Patent Office 3,564,659
Patented Feb. 23, 1971

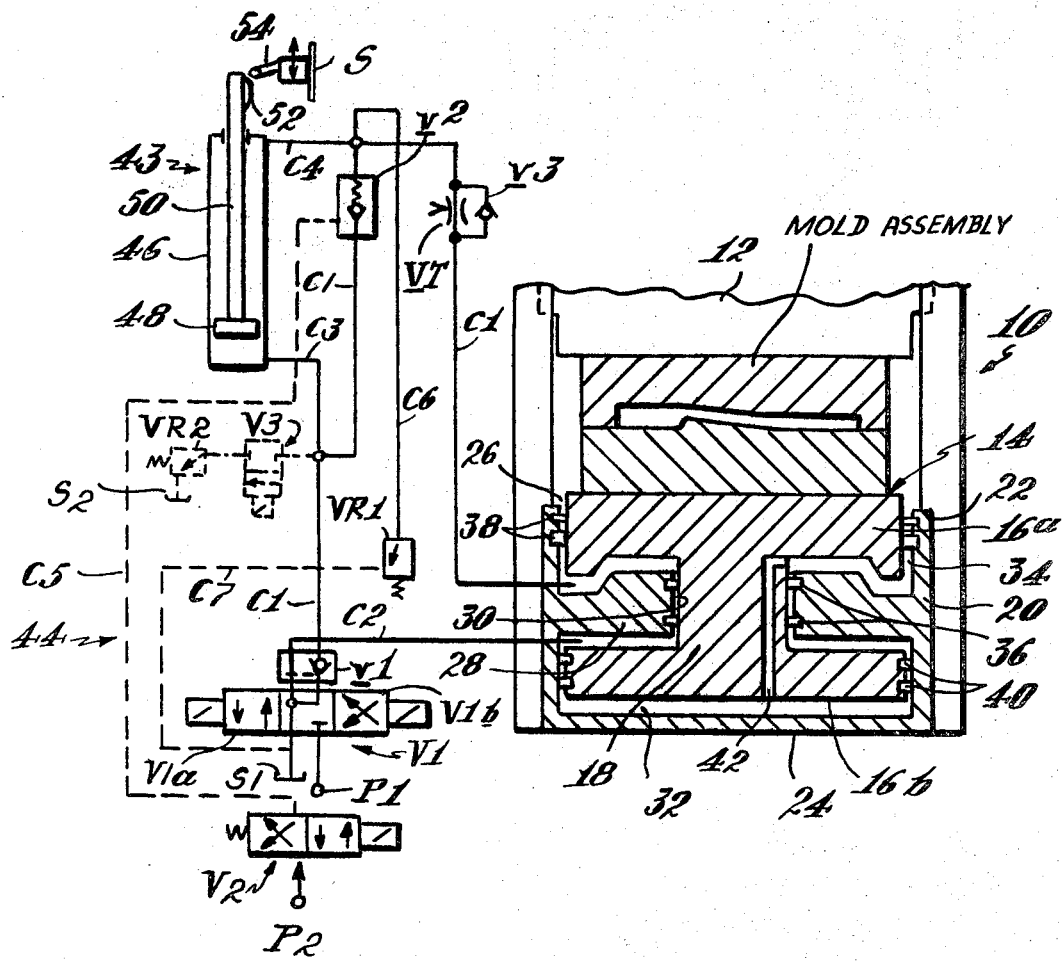

3,564,659
HYDRAULIC PRESS AND CONTROL THEREFOR
Friedrich Koch and Helmut Heym, Achim, near Bremen, Germany, assignors to Desma-Werke Gesellschaft mit beschrankter Haftung, Bremen, Germany
Filed Jan. 21, 1969, Ser. No. 792,321
Int. Cl. B29f 1/00
U.S. Cl. 18—30
8 Claims

ABSTRACT OF THE DISCLOSURE

A hydraulic press having fixed and movable platens between which a mold assembly may be held for receiving an injection of a bottom-forming composition in the manufacture of shoes, a large cylinder containing a piston movable therein a relatively short distance toward and away from the fixed platen for effecting movement of the movable platen toward the fixed platen for clamping and away from the fixed platen for unclamping, valve means for supplying pressure to the large cylinder to apply clamping pressure and for exhausting clamping pressure to permit controlled movement of the movable platen away from the fixed platen, a control piston movable in consonance with the large piston through a distance which is a relatively large multiple of the distance through which the large piston moves, a switch operable by movement of the control piston as the latter moves away from the fixed platen to disable the valve means and hence terminate movement of the large piston away from the fixed platen, and means for adjusting the initial position of the switch to obtain accurate control of the movable platen away from the fixed platen and hence separation of the mold parts.

BACKGROUND OF THE INVENTION

Hydraulic presses having fixed and movable platens are commonly used in shoe making operations where mold assemblies are employed, into which a bottom-forming composition is injected, to hold the mold parts together during injection and to permit limited separation during and/or after injection to provide for different degrees of densty and cellular structure in the finished product. Since the mold parts are relatively heavy and bulky, the movable platen is generally supported at a distance from the fixed platen so that the operator can hoist the mold assembly onto the movable part without being hampered by the presence of the fixed platen. In such presses a relatively small diameter cylinder and piston assembly is employed to move the movable platen rapidly up to a closing position relative to the fixed platen—a small cylinder and piston assembly being adequate since no pressure is involved. A relatively large cylinder and piston assembly is employed to apply the molding pressure and for this purpose is mounted to be moved by the piston of the small cylinder and piston assembly up to the fixed platen and so arranged that its piston imparts the closing movement to the movable platen after it has reached closing position. Locking means is provided at the closing position to fix the large cylinder so that the pressure developed therein will not displace the smaller piston. As related above, after the mold assembly has been closed and the bottom-forming composition is injected and even during its injection it may be desirable to permit limited separation of the mold parts to provide for different degrees of density and porosity in the finished article. Heretofore the separation has been controlled by engagement of a switch adjustably mounted in a place to be engaged by displacement of the movable platen or some part of the platen or piston by which it is moved. However, such movement is so small that it is virtually impossible to attain sufficient accuracy by adjustment of the switch due to lack of precision in the switch itself and in the adjustment therefor to obtain repeatable accuracy in the external dimensions of the molded product and/or its internal density and porosity. It is the purpose of this invention to provide an improved control which will insure accurate separation of the platens, although such separation is very small and hence to insure repeatable performance.

SUMMARY

As herein illustrated, the foregoing is accomplished by means of a large piston movable through a relatively short stroke in one direction to effect relative movement of the platens toward each other and in the other direction to effect relative movement of the platens away from each other, valve means movable from a neutral position to supply pressure fluid to the piston in one direction to advance the piston and in the other direction to retract the piston, a control piston movable in consonance with the large piston but through a greater distance, and switch means adjustably mounted relative to the control piston operable, by movement of the control piston as the latter is retracted in consonance with the large piston, to move the valve to said neutral position. The large piston is provided with a large cylinder and the control piston with a small cylinder and there are fluid conductors interconnecting the valve means and the large and small cylinders comprising a first main conductor through which fluid is adapted to be supplied to one end of the large cylinder, a second main conductor through which fluid is adapted to be supplied to the other end of the large cylinder, first and second branch conductors connected at one end to the first main conductor intermediate its ends and at their other ends to the opposite ends of the control cylinder, a first check valve in the first main conductor between the valve means and the branch conductors, a second check valve in the first main conductor situated between the branch conductors, and a third check valve in the first main conductor situated between the branch conductors and the one end of the large cylinder—the several check valves being spring-biased to permit flow to the one end of the large cylinder and prevent return flow therefrom. The large cylinder has closed and open ends and a wall intermediate its ends dividing it into closed and open chambers and the large piston has heads at its opposite ends, the head at one end being situated in the closed chamber and the head at the other end being situated in the open chamber and forming a closure therefor, the exposed side of the latter head constituting one of the platens. The piston contains a passage which extends from the inner side of the head in the open chamber to the outer side of the head in the closed chamber so that fluid pressure supplied to the one end of the cylinder to the inner side of the head in the open chamber is transmitted to the outer side of the head in the closed chamber to effect advance movement of the piston, and pressure supplied to the other end of the cylinder to the inner side of the head in the closed chamber effects retractive movement of the piston.

The invention will now be described in greater detail with reference to the accompanying drawing in which there is shown schematically a part of a hydraulic press with fixed and movable platens between which there is adapted to be mounted a mold assembly and a diagram of the control means and hydraulic circuit.

Referring to the drawings, the hydraulic press is provided with a frame 10 which supports a fixed platen 12 above and in spaced relation to a movable platen 14. The movable platen 14 comprises the upper head 16a of a double-head piston 18 of large diameter supported in a cylinder 20, vertically movable in the frame 10. The uppermost position of the cylinder 20 is limited by engagement of its upper end with a shoulder 22 on the frame. Although not shown, the cylinder 20 is raised to its position of engagement with the shoulder 22 by a piston and cylinder assembly wherein the piston is of much smaller size but has a much longer stroke to enable separating the platens quickly and to afford ample loading space between the platens. Suitable locking means is injected beneath the lower end of the cylinder 20 when it is raised into engagement with the shoulder 22 to hold it in this position independently of the small piston and cylinder assembly which is used to raise it to this position.

The hydraulic cylinder 20 has a closed end 24 and an open end 26 and is divided intermediate its ends by a transverse wall 28, containing a central opening 30, into a close chamber 32 and an open chamber 34. The head 16a of the piston is located in the open chamber 34 and constitutes a closure for it and also the movable platen 14. The head 16b is situated in the closed chamber 32 and the portion of the piston 18 between the heads which passes through the opening 30 is provided with sealing rings 36. Sealing rings 38 are provided around the head 16a and sealing rings 40 are provided around the head 16b. A passage 42 extends from the inner side of the head 16a through the piston to the outer side of the head 16b.

As thus constructed, pressure supplied to the chamber 34 and hence to the underside of the head 16a is in turn communicated through the passage 42 to the portion of the chamber 32 at the outer side of the head 16b to raise the piston 18 in a direction to raise the movable platen 14 and clamp the mold assembly against the underside of the fixed platen 12. Pressure supplied to the portion of the chamber 32 at the upper side of the head 16b will depress the piston and hence retract the movable platen from the fixed platen.

As shown, the mold assembly supported between the platens is for forming a unit sole and heel and if, for example, it is desirable to permit expansion of the material injected into the mold cavity during injection or following injection to provide for a cellular structure in which the cells are of predetermined or controlled size, it is necessary to allow separation of the mold parts. Such separation is very small and may be in the order of a few hundredths of an inch.

In order to provide for accurate control of the movement of the movable platen relative to the fixed platen to permit such limited separation, the movement of the hydraulic piston 18 must be amplified to enable visible adjustment and compensate for the lack of precision in the components employed. This is accomplished by a control device 43 which operates in conjunction with the hydraulic piston to amplify its stroke and to actuate a switch S. The switch S, when actuated, terminates retraction of the hydraulic piston. The control device is provided with a hydraulic control circuit 44 supplied with hydraulic fluid.

The control device 43 is a control piston and a control cylinder assembly comprising a cylinder 46 of relatively small diameter containing a piston 48 of relatively small diameter and movable through a relatively long distance compared to that of the hydraulic piston. The piston has fixed to it a piston rod 50 which extends from an end of the cylinder on which there is mounted a cam 52 which operates, by engagement with the trip finger 54 of the switch S, to trip the switch. Tripping the switch, as will appear hereinafter, terminates retraction of the hydraulic piston.

The hydraulic circuit 44, by means of which the hydraulic fluid is supplied both to the hydraulic piston and to the control piston, comprises a conductor line C1, one end of which is connected by way of a check valve v–1 to an electrically operable valve V1 having ends V1a, V1b through which hydraulic fluid is adapted to be supplied, to the line C1 when the valve V1 is shifted to place the end V1a in the center open position, by a pump P–1. The conductor line C1 is connected at its other end to the chamber 34 of the hydraulic cylinder. One end of the conductor line C2 is connected to the part of the chamber 32 at the inner side of the piston head 16b and its opposite end is connected through the end V1a of the valve V1 to a sump S1, so that in the open position of the valve V1, when pressure fluid is being delivered to the chamber 34, pressure fluid in the portion of the chamber 32 at the inner side of the head 16b can escape to the sump S1.

Intermediate the ends of the conductor line C1 there are two conductor lines C3 and C4, one end of each of these conductor lines being connected to the conductor line C1 and the other ends, respectively, to the lower and upper ends of the control cylinder 46, thus providing, during supply of hydraulic fluid through the conductor line C1, for delivery of hydraulic fluid through the conductor line C3 to the lower end of the control cylinder 46. Delivery of hydraulic fluid to the lower end of the control cylinder 46 raises the piston 48 therein, the piston in turn displacing the fluid above it through the conductor line C4 into the conductor line C1.

A check valve v–2 is located in the conductor line C1 between the conductor lines C3 and C4 and a check valve v–3 is interposed in the conductor line C1 beyond the conductor line C4 between it and the chamber 34. There is also in this portion of the conductor line C1 a throttle valve VT which bypasses the check valve v–3 and is adjustable to control return flow of the hydraulic fluid through the conductor line C1 during retraction of the hydraulic piston.

As thus described, when the electric valve VI is shifted from the position shown to the right to place the end V1a opposite the pump, the pump P1 is connected to the conductor line C1 and hydraulic fluid will be pumped thereby through the check valve v–1, check valve v–2 and check valve v–3 to the chamber 34, and from thence through the passage 42 to the portion of the chamber 32 at the outer side of the piston head 16b, so as to raise the piston 18 in its cylinder and so as to apply clamping pressure to the mold assembly. Simultaneously, hydraulic fluid is supplied through the conductor line C3 to the lower end of the control cylinder 46 to raise the control piston 48 therein. The hydraulic fluid above the piston 48 is forced through the conductor line C4 into the conductor line C1 and in conjunction with the fluid already in the conductor line C1, supplied to the chamber 34 and the portion of the chamber 32 at the outer side of the head 16b. The clamping pressure is maintained by shifting the valve V1 to the neutral position which is the position shown in the drawing. When it is desirable to allow the material within the mold to expand a predetermined amount, the switch S is set at a predetermined position for cut-off and the valve V1 is shifted from the neutral position to a position in which the end V1b is opposite the pump P1 thereby connecting the conductor line C2 to the part of the chamber 32 at the inner side of the piston head 16b, so as to effect depression of the hydraulic piston. As the hydraulic piston moves downwardly the conductor line C1 returns the hydraulic fluid from the chamber 34 and the portion of the chamber 32 at the outer side of the head 16b through the throttle valve VT to the control cylinder 40. The check valve v–2 prevents flow of the hydraulic fluid through it so that it enters the cylinder 46 above the piston 48 and lowers the piston 48 in consonance with the lowering of the hydraulic piston 18. The adjustable throttle valve VT is for the purpose of correlating the speed of the downward movement of the piston 48 in the control cylinder with the hydraulic piston in the hydraulic cylinder. When the piston 48 reaches a predetermined position depending upon the adjustment of the switch S, the cam 52, by engagement with the switch arm 54 of the switch S, terminates movement by causing the electric switch V1 to move back to its neutral position and thus interrupt the flow of hydraulic fluid through the conductor line C2 to the chamber 32. The hydraulic fluid displaced by the descent of the piston 24 in the control cylinder 23 is returned to the sump S1 by way of the conductor line C3 at the lower end of the control cylinder and through the check valve v–1 which is raised for this purpose.

When the molding operation has been completed and it is desirable to remove the formed article, the hydraulic piston 18 is retracted an additional distance by moving the electric valve V1 from the neutral postion to the position in which the end V1b is opposite the pump P1, so as to supply hydraulic fluid from the pump P1 through the conductor line C2 to the chamber 32 above the inner side of the piston head 16b and by simultaneously shifting an electric valve V2 to a position to place the end of a conductor line C5 in communication with a pump P2. The opposite end of the conductor line C5 is connected to the conductor line C1 at the downstream side of the check valve v–2. Shifting of the valve V2 connects the pump P2 with the conductor line C5 so that hydraulic fluid is delivered to the conductor line C1 at the downstream side of the check valve v–2 and lifts the valve from its seat thus permitting hydraulic fluid from the chamber 34 and the portion of the chamber 32 at the outer side of the head 16b to flow back through the conductor line C1 to the sump S1.

A conductor line C6 is connected at one end to the conductor line C1 at the upstream side of the valve v–2 and at its other end to an adjustable relief valve VR1, the latter in turn being connected by a conductor line C7 to the sump S1. The relief valve VR1 is adjustable to maintain the proper pressure level for operation of the hydraulic cylinder but will permit releif of the hydraulic fluid in the circuit in the event of an excessive or overload condition.

Instead of employing a throttle valve VT for controlling retraction of the hydraulic piston, control can be achieved with the aid of a relief valve VR2 which is connected at one side by way of an electric valve V3 with the conductor line C1 and at the other side with a sump S2. The relief valve VR2 is adjustable to a predetermined pressure level and the hydraulic fluid displaced from the chamber 34 and the portion of the chamber 32 at the outer side of the head 16b flows into the control cylinder 46 and forces the hydraulic fluid, which is present in the control cylinder, below the control piston 48 through the valve VR2 into the sump S2.

The hydraulic cylinder and piston assembly described above may be replaced by a mechanically operated system designed to multiply the stroke of the hydraulic piston sufficiently to enable making adjustments relative to the switch S which will not be nullified by the lack of precision in the control mechanism.

It should be understood that the present disclosure is for the purpose of illustration only and that this invention includes all modifications and equivalents falling within the scope of the appended claims.

We claim:

1. In combination with a hydraulic press embodying spaced parallel platens supported for movement relative to each other, on the one hand to clamp mold parts therebetween and on the other hand to release said mold parts, a large piston movable through a relatively short stroke in one direction to effect relative movement of the platens toward each other and in the other direction to effect relative movement of the platens away from each other, valve means movable from a neutral position to supply pressure fluid to the piston in one direction to advance the piston and in the other direction to retract the piston, a control piston movable in consonance with the large piston but through a greater distance, and switch means adjustably mounted relative to the control piston operable, by movement of the control piston as the latter is retracted in consonance with the large piston, to move the valve to said neutral position.

2. A hydraulic press according to claim 1, comprising a large cylinder containing the large piston, a small cylinder containing the control piston, and fluid conductors interconnecting the valve means and said cylinders comprising a first main conductor through which fluid is adapted to be supplied to one end of the large cylinder, a second main conductor through which fluid is adapted to be supplied to the other end of the large cylinder, first and second branch conductors connected at one end to the first main conductor intermediate its ends and at their other ends to the opposite ends of the control cylinder, a first check valve in the first main conductor between said valve means and said branch conductors, a second check valve in the first main conductors situated between the branch conductors, and a third check valve in the first main conductor situated between the branch conductors and the large cylinder, said check valves being spring-biased to permit flow to said one end of the large cylinder and to prevent return flow therefrom.

3. A hydraulic press according to claim 1, comprising a first pump for supplying pressure fluid through said valve means to the conductor means.

4. A hydraulic press according to claim 1, comprising a safety conductor connected at one end to the first main conductor between said second and third check valves, a safety valve at the other end of said safety conductor adjustable to yield to a predetermined pressure, a sump, and a return conductor connected at one end to said safety valve and at its other end to said sump.

5. A hydraulic press according to claim 1, comprising an adjustable throttle valve in the first main conductor short-circuiting said third check valve.

6. A hydraulic press according to claim 1, comprising an auxiliary conductor line connected at one end to the main conductor at the downstream side of the second check valve, for supplying pressure fluid to said second check valve to open it, and second valve means movable to a position to supply pressure fluid to said auxiliary conductor.

7. A hydraulic press according to claim 2, comprising an adjustable relief valve, third valve means operable to connect said relief valve with the first main conductor intermediate said first and second check valves, a sump, and means connecting the relief valve thereto.

8. A hydraulic press according to claim 2, wherein the large cylinder has closed and open ends and a wall intermediate said ends dividing it into closed and open chambers, and said piston has heads at its opposite ends, the head at one end being situated in the closed chamber and the head at the other end being situated in the open chamber and forming a closure therefor, the exposed side of said latter head constituting one of the platens, said piston containing a passage which extends from the inner side of the head in the open chamber to the outer side of the head in the closed chamber so that fluid pressure supplied to the one end of the cylinder to the inner side of the head in the open chamber is transmitted to the outer side of the head in the closed chamber to effect advance movement of the piston, and pressure supplied to the other end of the cylinder to the inner side of the head in the closed chamber effects retractive movement of the piston.

References Cited

UNITED STATES PATENTS

| 2,481,991 | 9/1949 | Ernst | 18—30 |
| 3,166,794 | 1/1965 | Scanlon | 18—30 |

H. A. KILBY, JR., Primary Examiner